United States Patent [19]

Georg

[11] Patent Number: 4,781,279
[45] Date of Patent: Nov. 1, 1988

[54] CONTROL MECHANISM FOR A TORQUE CONVERTER WITH BRIDGE CLUTCH

[75] Inventor: Gierer Georg, Kressbronn, Fed. Rep. of Germany

[73] Assignee: Zahnradfabrik Friedrichshaften AG, Fed. Rep. of Germany

[21] Appl. No.: 899,385
[22] PCT Filed: Sep. 13, 1985
[86] PCT No.: PCT/EP85/00463
§ 371 Date: May 20, 1986
§ 102(e) Date: May 20, 1986
[87] PCT Pub. No.: WO86/01870
PCT Pub. Date: Mar. 27, 1986

[30] Foreign Application Priority Data

Sep. 20, 1984 [EP] European Pat. Off. ............ 84/00290

[51] Int. Cl.⁴ .............................................. F16D 47/02
[52] U.S. Cl. ..................... 192/3.3; 192/3.31
[58] Field of Search ............... 192/0.032, 0.075, 0.076, 192/3.29, 3.3, 3.31, 3.33

[56] References Cited

U.S. PATENT DOCUMENTS

| | | | |
|---|---|---|---|
| 4,023,444 | 5/1977 | Murakami | 192/0.032 |
| 4,428,467 | 1/1984 | Hiramatsu | 192/0.076 |
| 4,448,293 | 5/1984 | Maeda | 192/3.3 |
| 4,457,411 | 7/1984 | Hiramatsu | 192/0.076 |
| 4,458,720 | 7/1984 | Gierer | 192/3.31 |
| 4,558,769 | 12/1985 | Neisen | 192/3.31 |
| 4,577,737 | 3/1986 | Niikura et al. | 192/3.3 |
| 4,582,185 | 4/1986 | Grimes et al. | 192/0.076 |

FOREIGN PATENT DOCUMENTS

| | | | |
|---|---|---|---|
| 1463 | 1/1985 | Japan | 192/3.3 |
| 146957 | 8/1985 | Japan | 192/3.3 |
| 184763 | 9/1985 | Japan | 192/3.3 |
| 168956 | 9/1985 | Japan | 192/3.3 |
| 2081413 | 2/1982 | United Kingdom . | |

Primary Examiner—Rodney H. Bonck
Assistant Examiner—David A. Testardi
Attorney, Agent, or Firm—Hayes, Davis & Soloway

[57] ABSTRACT

A control mechanism for a torque converter with bridge clutch and a lubrication circuit for a hydrodynamic-mechanical combined transmission, wherein the hydraulic operating pressure which charges the torque converter (3) and closes the converter direct clutch (31) is switched on in a pulse-modulation process via a solenoid value (4) controlled by an electronic unit (5) so that the operating pressure slowly builds up and diminishes and the converter direct clutch (31) engages and disengages softly.

3 Claims, 1 Drawing Sheet

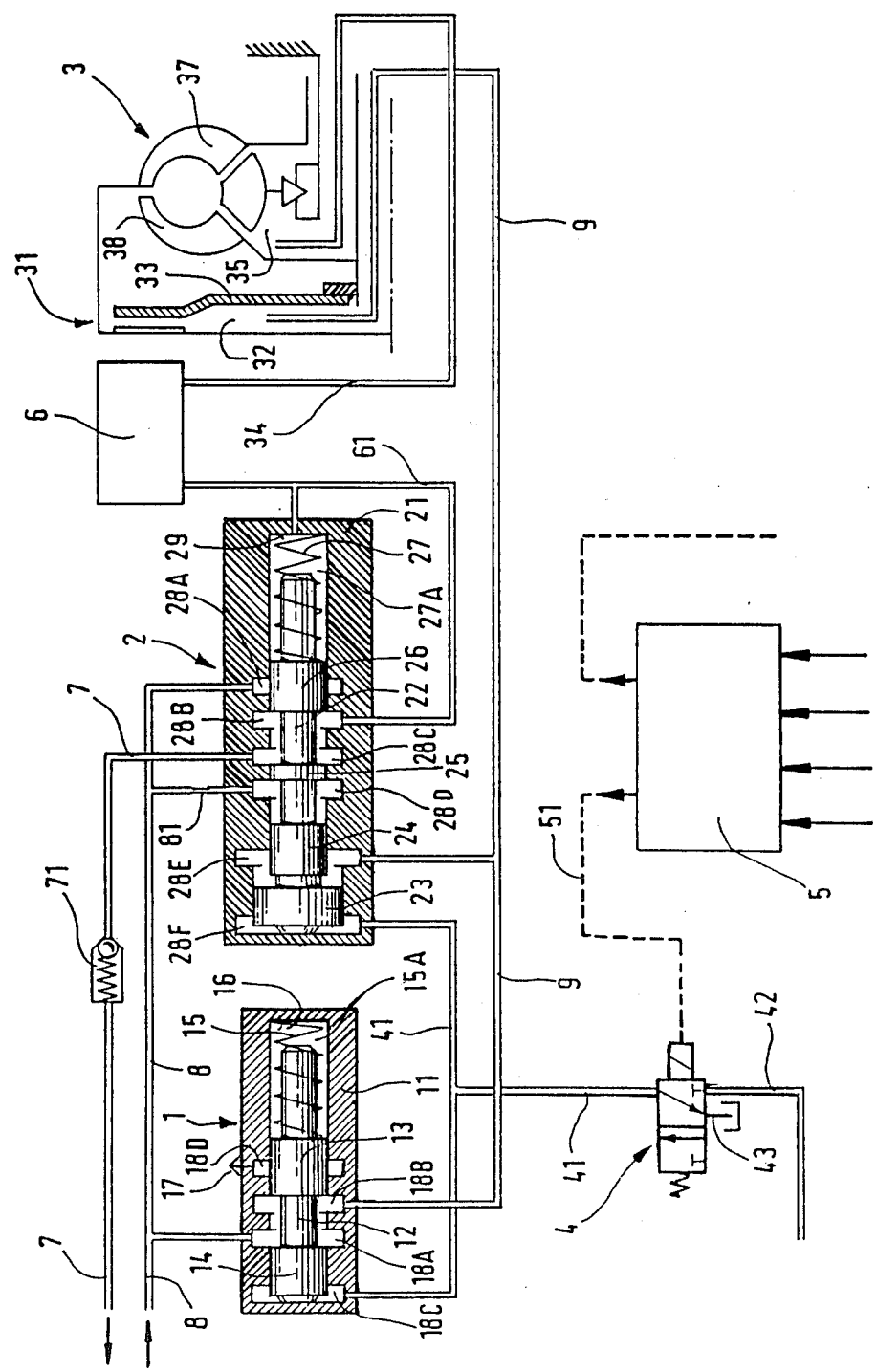

CONTROL MECHANISM FOR A TORQUE CONVERTER WITH BRIDGE CLUTCH

The invention concerns a control mechanism for a torque converter with bridge clutch in a hydrodynamic-mechanical combined transmission, especially for motor vehicles.

West German OS No. 31 03 838 has disclosed controlling the charging of a torque converter, the engagement and disengagement of the converter bridge clutch, a cooler circuit and the supply of lubricant for the mechanical transmission with a combined pressure and directional valve.

These mechanisms have proved satisfactory since their construction is simple, in spite of the multiple functions to be carried out.

With further improvement in gearshift quality, especially in automatic transmissions equipped with an electro-hydraulic control mechanism, the above cited solution became unsatisfactory for engaging the bridge clutch; thus, damper has been added to the operating pressure pipe which effects the engagement of the converter bridge clutch in the pressure and directional valve in a manner known per se to soften the closing of the converter bridge clutch.

Despite considerable improvement in the converter bridge, the gearshift is still not equally satisfactory when it comes to opening the converter clutch.

The invention, is, therefore, aimed at solving the problem of improving a control mechanism at the least possible expense so that shocks no longer occur even when the converter clutch is released.

By modulated switching on and off of the operating pressure with a solenoid valve, both to create converter pressure and to actuate the converter bridge clutch, it is possible to obtain in a simple manner a shockless exchange between the activity of the torque converter and that of the bridge. The arrangement of the pulse-modulation process in switching the operating pressure on and off also results in a control mechanism of simple construction.

Whereas in the prior art, a relatively complicated combination converter pressure and directional valve and a throttle together with the solenoid valve served to control only the closing of the converter clutch, in the present embodiment two relatively simple control valves combined with the solenoid valve unchanged in principle and the simple control thereof by an electronic unit already present are sufficient to control both opening and closing for the direct clutch, for instance.

The operational and constructional developments underscore in one embodiment the relative simplicity of the solution to the problem.

Other details of the invention are explained with reference to one embodiment and to one drawing; and the details of the drawing constitute the object of the invention.

In the drawing:

The FIGURE is an embodiment of the control mechanism.

There is arranged a converter pressure valve 1 with a valve body 11 and a piston slide valve 12 with only two control pistons 13, 14 and a spring. Pressure is passed via a system pressure pipe 8 into an annular space 18A and is controlled depending on the position of the control pistons 13 and 14 and on the spring 15, and is fed via the annular space 18B and the converter pressure pipe 9 and thence via the piston hollow space 32 to charge both the converter clutch valve 2 and the converter 3. The valve body 11 also has a third annular space 18C into which passes an operating pressure pipe 41. A fourth annular space 18D communicates with the pressure relief channel 17.

In the converter clutch valve 2 having a valve body 21 and a piston slide valve 22 with four control pistons 23, 24, 25, and 26 there is situated also a spring 27. The system pressure pipe 8 leads both directly into a first annular space 28A and again, via a throttle 81, into a fourth annular space 28D. The second annular space 28D is connected by the pipe 61 with the cooler 6 and the spring space 27A. The third annular space 28C has a connection with the lubrication system of the mechanical transmission across a pipe 7 and a ball valve 71. The fifth annular space 28E is connected with the converter pressure pipe 9 and the sixth annular space 28F with the operating pressure pipe 41.

The torque converter 3 has a converter bridge clutch 31 and is charged via the converter pressure pipe 9, which leads into the piston hollow space 32, this pressure simultaneously keeping the converter bridge clutch open. The medium heated in the converter operation is drained from the working space 35 via the pressure pipe 34 and the cooler 6 into the lubrication system of the mechanical transmission.

A fluid-supply pipe 42 leads to the solenoid valve 4 and the outgoing operating pressure pipe 41 leads both to the converter pressure valve 1 and to the converter clutch valve 2. A pressure relief 43 drains fluid from operating pressure pipe 41 when solenoid valve 4 is closed. The switching of the solenoid valve 4, which has been timed to a predetermined period of duration, occurs via a control line 51 from the electronic unit 5 to the solenoid valve.

The controlled gearshift of the converter bridge clutch acts as follows: In the open state of the converter bridge clutch 31, the pressure medium flows from an operating pressure valve not shown via the operating pressure pipe 8 to the annular space 18A of the converter pressure valve 1. This pressure is controlled via the position of the control pistons 13, 14 interacting with the spring 15, and guided via the converter pressure pipe 9 from the annular space 18B to the piston hollow space 32 of the converter bridge clutch 31 and from there to charge the working space 35 of the torque converter. The converter bridge clutch 31 is simultaneously kept open and the torque introduced via the pump impeller 37 is transmitted to the turbine 38 having been converted in a manner known per se. The heated medium flows out from the working space 35 via the pressure pipe 34 to the cooler 6 and from there, via the pipe 61 and the connected annular spaces 28B and 28C in this position of the converter clutch valve 2, into the pipe 7, which leads to the lubrication system of the mechanical transmission.

Engagement of the converter bridge circuit 31 is controlled in accordance with initial motor and transmission speed by the electronic unit 5. A solenoid valve 4 is switched in the pulse-modulating process via a control line 51 in a manner such that a pressure builds up relatively slowly in the operating pressure pipe 41. At the same time the solenoid valve 4 reciprocatingly shifts between its two stable "fully closed" and "fully open" conditions in a cycle of constant pulse frequency, while the ratio of the open period to the closed period is modified subject to the control signal. The solenoid valve 4 is brought here, for instance, from the final "fully cloded" position to the final "fully open" position in dependence upon the control signal.

The operating pressure that builds up in the operating pressure pipe 41 and acts via the annular space 18C on the control piston 14 moves the piston slide valve 12 of the converter pressure valve 1 to the right against the pressure of the spring 15 so that the annular space 18A is closed and the annular space 18B and 18D are connected and thus the converter pressure pipe 9 is relieved by the pressure relief channel 17. The displacement of the piston slide valve 12 and the pressure relief of the converter pressure pipe 9 occurs here in accordance with the pressure buildup in the operating pressure pipe 41.

Since the operating pressure to the converter pressure valve 1 is also fed in parallel to the converter clutch valve 2, the displacement of the piston slide valve 22 takes place in analogous manner. Here the annular spaces 28A and 28B become connected so that the system pressure from the system pressure pipe 8 extends into the working space 35 of the torque converter 3 via the pipe 61, the cooler 6 and the pressure pipe 34 and simultaneously, depending on the pressure buildup in the operating pressure pipe 41, closes the converter bridge clutch and keeps it closed.

When the converter bridge clutch 31 is closed, the mechanical transmission is lubricated via the throttled (throttle 81) system pressure from the system pressure pipe 8 and the connected annular spaces 28D and 28C of the converter clutch valve 2.

The displacement of the piston slide valves 12 and 22 of the converter pressure valve 1 and of the converter clutch valve 2 terminates on the detents 16 and 29.

The control signal closing the solenoid valve 4 and thus reopening the converter bridge clutch 31 comes from the electronic unit 5 via the control pipe 51. At the same time, however, the solenoid valve 4 is controlled inversely in the manner described so as to reduce the operating pressure in the operating pressure pipe 41. As a result, the converter bridge clutch 31 opens slowly, since the converter pressure valve (1) and the converter clutch valve (2) which depend on the same factors return to their initial position due to the pressure of springs 15 and 27.

I claim:

1. A control mechanism for a torque converter (3) with a converter direct clutch (31) and a lubrication circuit (7) for a hydrodynamic, mechanical transmission in which an operating pressure effects, via a control valve device, the charge of said torque converter (3) or engaging of said converter direct clutch (31), wherein a solenoid valve (4), actuated by an electronic unit (5), controls the operating pressure of the control valve device, characterized in that a converter pressure valve (1) and a converter clutch valve (2), each supplied with system pressure, are arranged between said solenoid valve (4) and said torque converter (3), both said valves being controlled via a common operating pressure pipe (41) coming from said solenoid valve (4) for charging said torque converter (3) and engaging said converter direct clutch (31), the switching on and off of said solenoid valve (4) occurring in a pulse-modulation process so that said operating pressure slowly builds up and slowly diminishes and said converter direct clutch (31) softly engages and disengages, said solenoid valve (4) is connected with said electronic unit (5) by a control line (51); wherein when said operating pressure pipe (41) is drained by a pressure relief pipe (43), said converter pressure valve (1) supplies the system pressure through a converter pressure pipe (9) and charges said torque converter (3) for disengaging and keeping disengaged said converter direct clutch (31), and fluid backflow from the torque converter enters into the lubrication circuit (7) of the mechanical transmission via a cooler (6) and said converter clutch valve (2), and when said operating pressure builds up in said operating pressure pipe (41) and depending thereon, said converter pressure valve (1) closes the supply of said system pressure and relieves pressure, via pressure relief channel 17, in said converter pressure pipe (9) and said torque converter (3), and said converter clutch valve (2) guides said system pressure via said cooler (6) into a working space (35) of said torque converter (3), engages said converter direct clutch (31), and produces a connection of said system pressure to said lubrication circuit (7) via a throttle.

2. A control mechanism according to claim 1, characterized in that when said operating pressure diminishes and depending thereon,
said converter pressure valve (1) closes the pressure relief of said torque converter (3) and supplies said system pressure to said torque converter (3) and at the same time disengages ssaid converter direct clutch (31), and
said converter clutch valve (2) shuts off the supply of said system pressure and opens a fluid backflow from said torque converter (3) via said cooler (6) into said lubrication circuit (7) of said mechanical transmission.

3. A control mechanism for a torque converter (3) with a converter direct clutch (31) and a lubrication circuit (7) for a hydrodynamic, mechanical transmission in which an operating pressure effects, via a control valve device, the charge of said torque converter (3) or engaging of said converter direct clutch (31), wherein a solenoid valve (4), actuated by an electronic unit (5), controls the operating pressure of the control valve device, characterized in that a converter pressure valve (1) and a converter clutch valve (2), each supplied with system pressure, are arranged between said solenoid valve (4) and said torque converter (3) both said valves being controlled via a common operating pressure pipe (41) coming from said solenoid valve (4) for charging said torque converter (3) and engaging said converter direct clutch (31), the switching on and off of said solenoid valve (4) occurring in a pulse-modulation process so that said operating pressure slowly builds up and slowly diminishes and said converter direct clutch (31) softly engages and disengages, wherein said converter pressure valve (1) comprising a housing (11) with four annular spaces (18A to 18D) and a spring space (15A), a piston slide valve (12) with two control pistons (13, 14) and a spring (15) guided thereon, and the converter clutch valve comprising a housing (21) with six annular spaces (28A to 28F) and a spring space (27A), a piston slide valve (22) with four control pistons (23, 24, 25, 26) and a spring (27) guided thereon, are interconnected as follows:
said electronic unit (5) is connected with said solenoid valve (4) by a control line (51),
said solenoid valve (4) is provided with a fluid-supply pipe (42) and a pressure relief pipe (43) and is connected with a third annular space (18C) of said converter pressure valve (1) and a sixth annular space (28F) of said converter clutch valve (2) by said operating pressure pipe (41), said converter pressure valve (1), communicating with a pressure relief channel (17) and a system pressure pipe (8) is connected with a fifth annular space (28E) of said converter clutch valve (2) and a piston hollow space (32) of said converter direct clutch (31) in said torque converter (3) by a converter pressure pipe (9), said converter clutch valve (2) communicates directly with the system pressure pipe (8), a throttled system pressure pipe, and the lubrication circuit (7) for said mechanical transmission, and said spring space (27A) of said converter clutch valve is connected by a pipe (61) with a working space (35) of said torque converter (3) via a cooler (6).

* * * * *